C. E. WHITE.
PLANTER.
APPLICATION FILED AUG. 13, 1909.
1,287,541.
Patented Dec. 10, 1918.
6 SHEETS—SHEET 1.
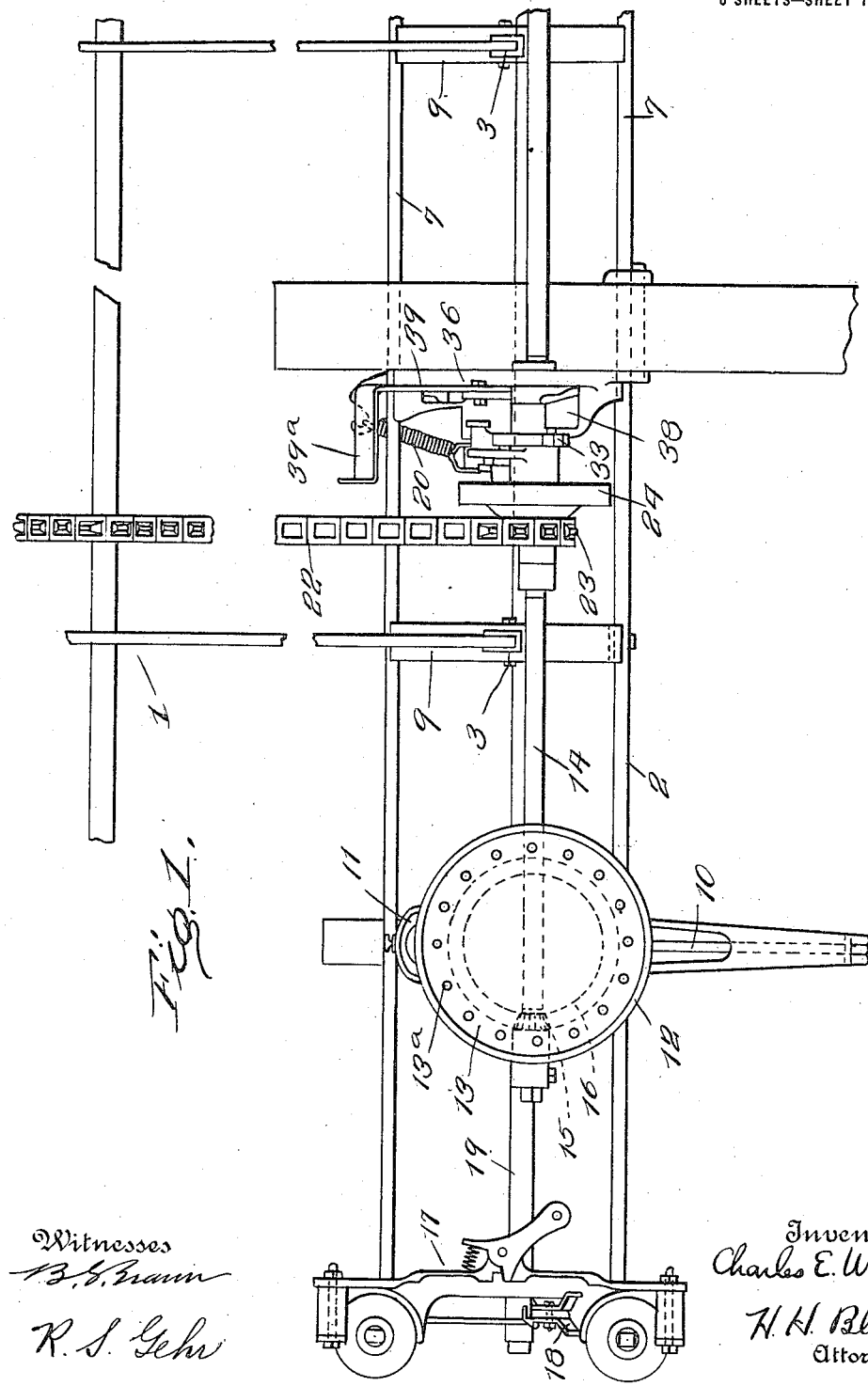

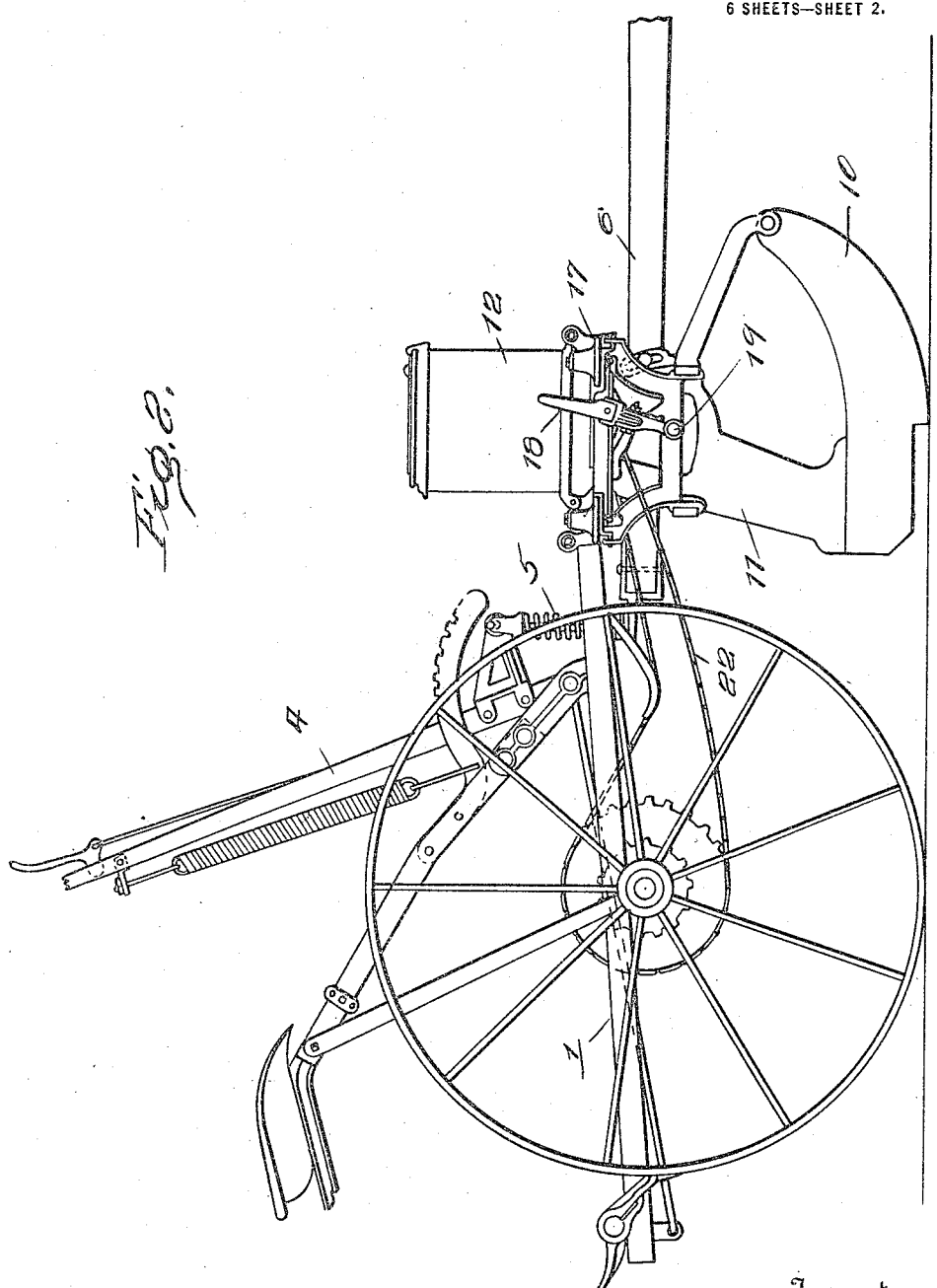

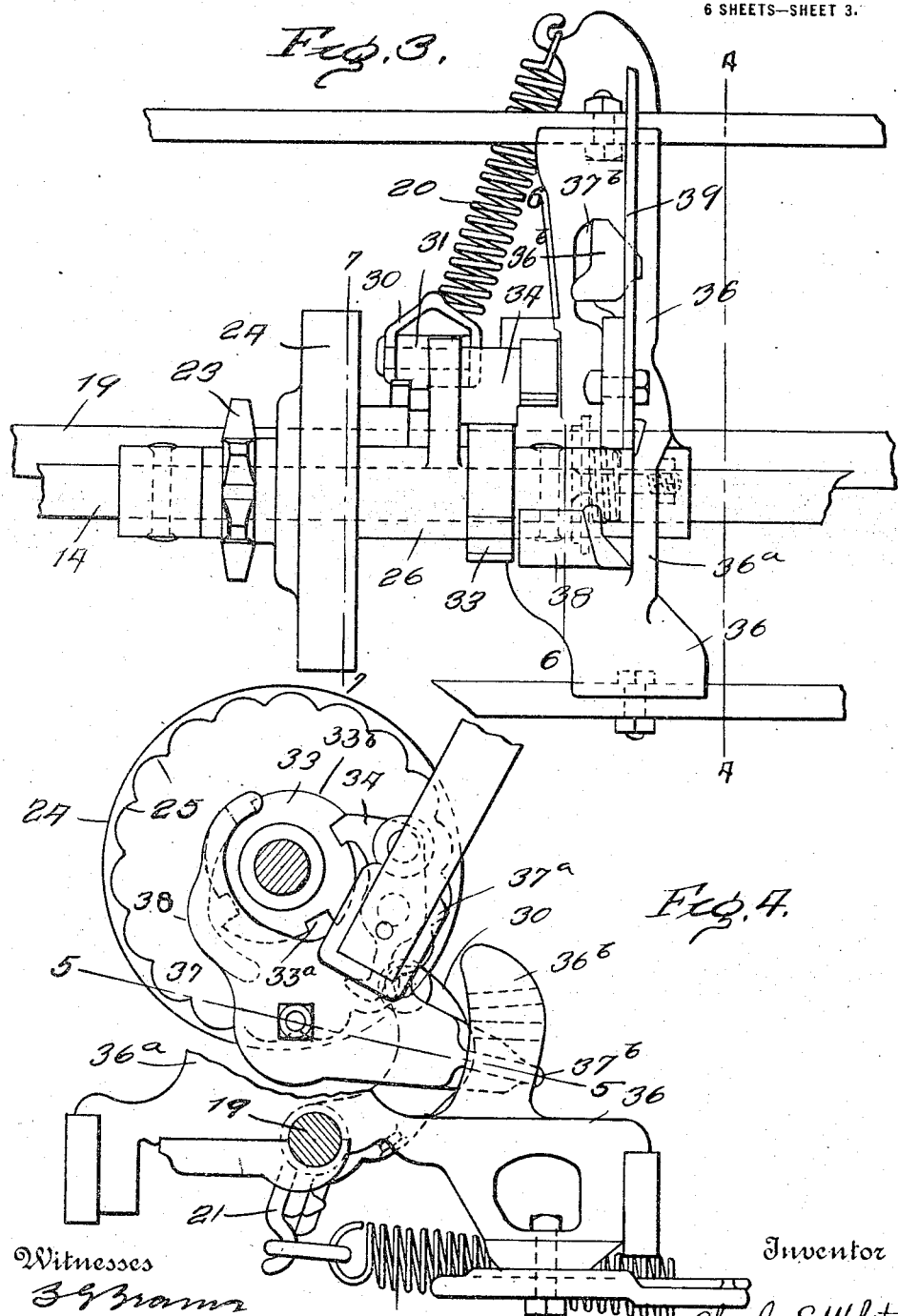

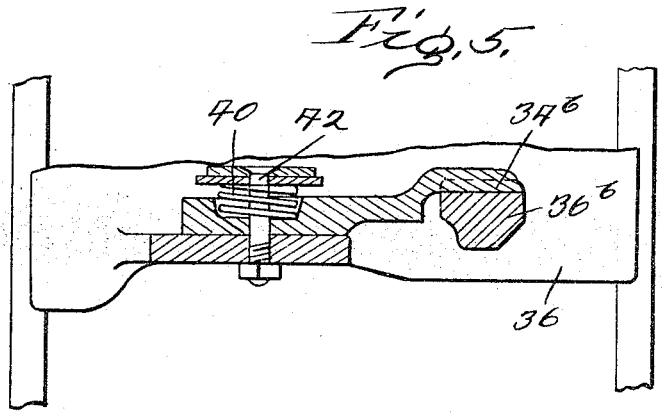
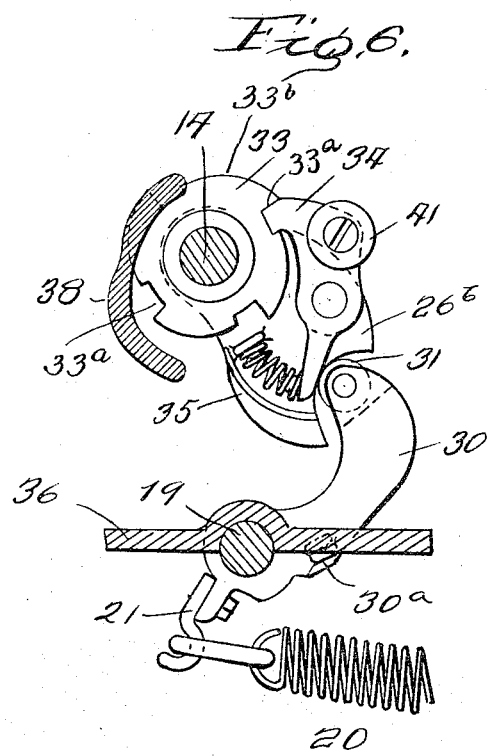

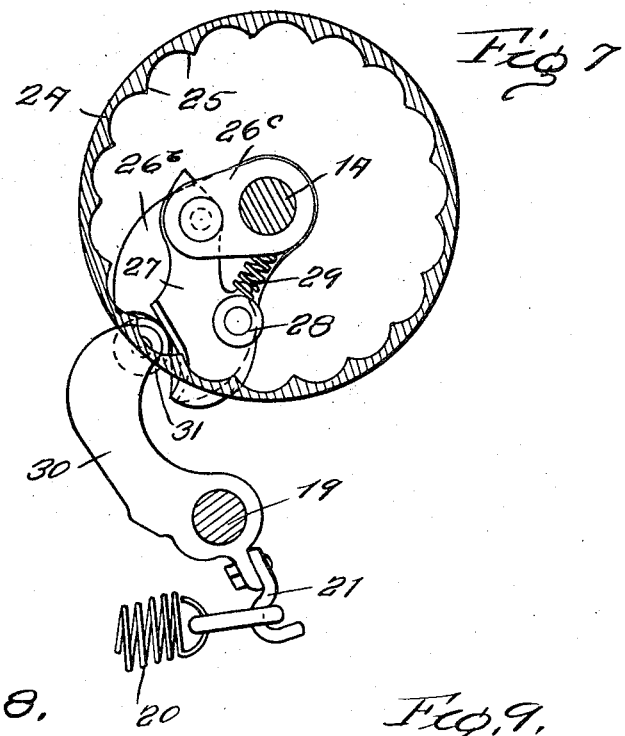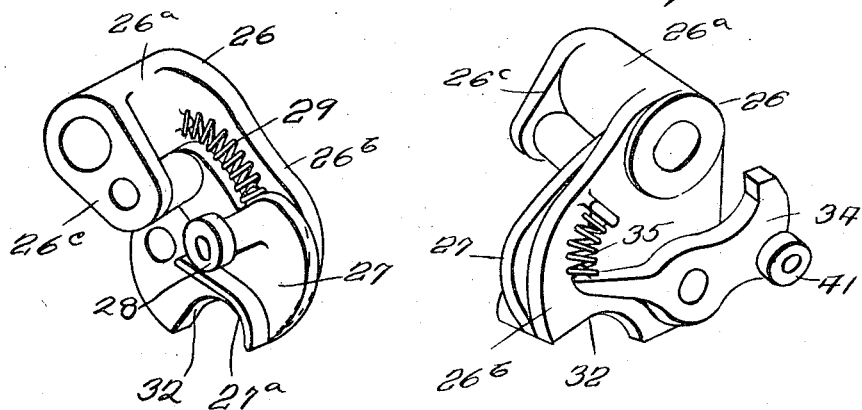

C. E. WHITE.
PLANTER.
APPLICATION FILED AUG. 13, 1909.
1,287,541.
Patented Dec. 10, 1918.
6 SHEETS—SHEET 6.
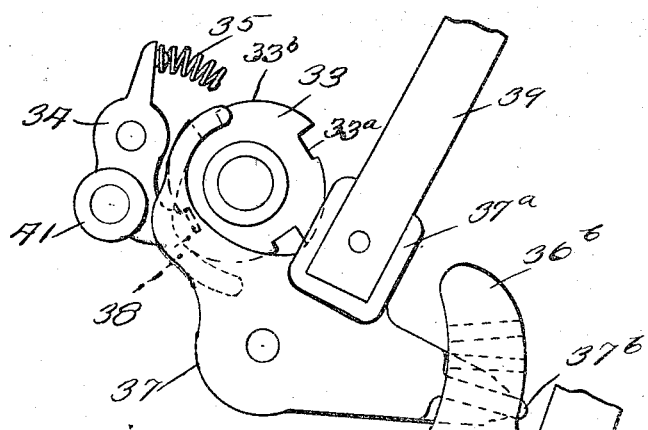
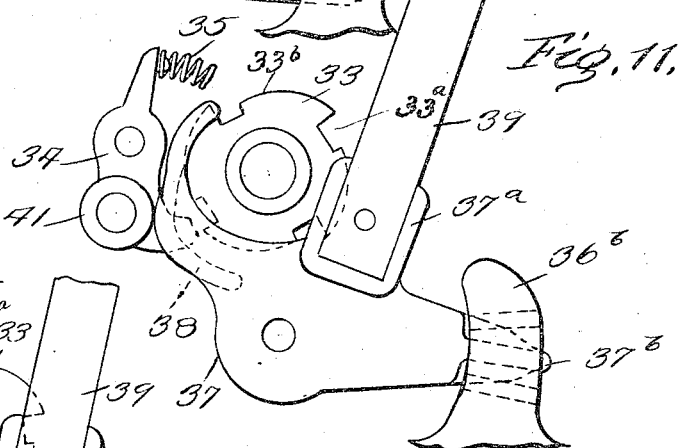
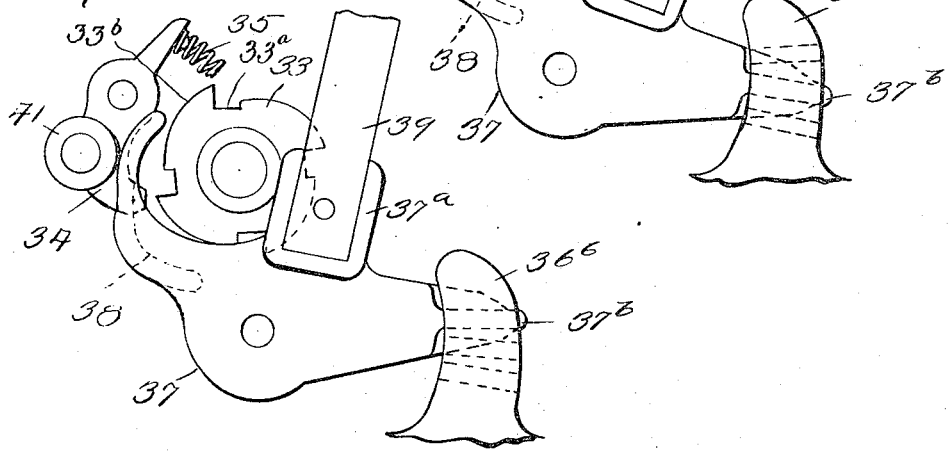
Witnesses
Inventor
Charles E. White
H. H. Bliss
Attorney

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

PLANTER.

1,287,541.   Specification of Letters Patent.   Patented Dec. 10, 1918.

Application filed August 13, 1909. Serial No. 512,740.

*To all whom it may concern:*

Be it known that I, CHARLES E. WHITE, a citizen of the United States, residing at Moline, in the county of Rock Island and State of Illinois, have invented certain new and useful Improvements in Planters, of which the following is a specification, reference being had therein to the accompanying drawing.

This invention relates to devices for planting seeds, such as corn, and has to do especially with planters which comprise mechanism for accurately counting the seeds as they are separated from the initial mass in a feed hopper; means for accurately discharging the seeds, either singly or in predetermined numbers and depositing them at desired points in or on the ground; and means for transmitting power from the ground wheels to the seed mechanism adapted to operate intermittently to effect the counting and dropping of the seeds and adapted also to vary, at the will of the operator, the number of seeds delivered at each dropping action.

The especial object of the present invention is to provide power transmitting means having simple and efficient devices for effecting the variable intermittent action above referred to.

In the accompanying drawings, which show a planter embodying my invention,

Figure 1 is a plan view of a part of the machine.

Fig. 2 is an end elevation of the machine.

Fig. 3 is a plan of the power transmitting mechanism.

Fig. 4 is an enlarged vertical section taken on the line 4—4 in Fig. 3.

Fig. 5 is a section on the line 5—5 of Fig. 4.

Fig. 6 is a vertical section on the line 6—6 in Fig. 3.

Fig. 7 is a vertical section on the line 7—7 in Fig. 3.

Figs. 8 and 9 are perspective views of part of the clutch mechanism.

Figs. 10, 11 and 12 are end elevations of part of the clutch mechanism showing the adjustable cam in different positions.

The planter shown in the drawings comprises a rear frame 1 mounted in the usual manner upon two ground wheels, and a front frame 2, these frames being hinged together at 3, 3. A hand lever 4, suitably mounted on the rear frame, has a link connection 5 with the rear end of the tongue 6, said tongue being rigidly secured to the frame 2. By means of the said hand lever, the front and rear frames may be adjusted into various relative positions and secured in the desired relation to each other.

The front frame 2 comprises front and rear transverse bars 7 and 8 which are connected by cross bars 9, 9. At its ends the frame has ground opening or furrow opening runners 10, which may be of the usual character, and seed conducting chutes or boots 11 provided with valves for receiving, temporarily holding, and delivering seeds or kernels which may be deposited upon them.

At each end of this frame, that is to say, on each side of the mechanism as an entirety, is placed a seed hopper 12. Into this a quantity of the seed can be placed and at the bottom it can be provided with any known or suitable delivering device. I have shown the machine in the drawings as provided with a rotary plate at the bottom of said hopper capable of receiving seeds from the mass and also capable of being rotated so as to deliver them to the aforesaid chutes or boots and to the valve devices therein.

Seed plates of numerous sorts are now known, any one of which can be used in this place and for this purpose. I have shown a circular plate 13 with a circular series of apertures or cells 13ª; but, instead of this, use can be made of any of the forms of "edge-drop" plates, such, for example, as are shown in Patent No. 682,178, dated Sept. 10, 1901.

A seeder shaft 14 is rotatably mounted upon the front frame 2 and carries at each end beneath the said hopper a beveled pinion which meshes with an annular gear 16 carried by the seed plate 14. By this gearing the seed plates are driven from the shaft 14. Here, too, there may be several modifications, as numerous forms of construction and various arrangements of these parts are now well known.

The mechanism illustrated is also provided with what is known as a check-row apparatus, there being a check-head at 17 on each end of the front frame 2. These check-heads and their several parts may be of any preferred form. As shown, each has a check-fork at 18, which is adapted to engage the tappets on the check-row wire. These check-forks are connected to a rock shaft 19, which extends across the machine, preferably below the said hoppers. A spring at 20 is connected to a crank arm 21 carried by the rock shaft and tends to hold said shaft in a predetermined position with the check-forks disposed vertically.

The seeder shaft 14 is driven from the ground wheels or covering wheels or from the axle upon which they are mounted. As shown, power is transmitted from the wheel axle by means of a sprocket chain 22, which engages a sprocket wheel 23 which rotates loosely upon the seeder shaft 14.

The sprocket wheel 23 is rigidly secured to or preferably cast with a clutch element 24, which is in the form of a wheel or short drum having internal teeth 25. Normally, the sprocket wheel 23 and toothed drum 24 are continuously rotated by the sprocket chain 22 as the machine advances.

As it is desirable to give the seed plate an intermittent movement of greater or less extent, according to the number of seeds to be planted in a hill, some means must be provided to intermittently transmit the movement of the clutch element 24 to the seeder shaft 14. For this purpose I have devised the following construction. 26 is a carrier loosely sleeved on the seeder shaft and disposed adjacent the toothed drum 24. The carrier comprises a sleeve part 26$^a$ and an outwardly extending plate part 26$^b$. A clutch dog 27 is pivotally mounted on the carrier between the plate 26$^b$ and a lug 26$^c$ formed on the sleeve part of the carrier. This dog is provided with a roller 28 adapted to engage the teeth 25 of the drum 24. A spring 29 interposed between the dog 27 and the carrier 26 tends normally to maintain the roller 28 in engagement with the drum 24. Said roller, however, is held out of engagement in opposition to the action of the spring by means of the large spring 20. That is to say, the rock shaft 19 has an upwardly extending crank arm 30, having at its free end a roller 31, which engages a rounded recess 27$^a$ in the clutch dog 27. The roller 31 similarly engages a seat or recess 32 formed in the plate 26$^b$ of the carrier. The tension of the spring 20, therefore, is transmitted through the crank arms 21 and 30 to the rock shaft 19, and serves to press the dog 27 forward and hold the roller 28 out of engagement with the clutch drum 24. The movement of the parts under the action of the heavy spring 20 is limited by a stop 30$^a$, which engages a stop projection carried by a part rigid with the front frame 2.

When the check-fork is engaged by a tappet on the check-row wire, it is clear that the crank arm 30 will be thrown backward so that the spring 29 is permitted to swing the dog 27 outward to bring its roller 28 into engagement with the clutch element 24. The carrier 26, being thus connected through the dog 27 with the element 24, is caused to move with it and will continue such movement throughout one revolution; that is to say, until the dog 27 comes again into engagement with the roller 31 of the crank arm, the latter having been returned to its normal position by the spring 20.

To transmit the movement of the carrier 26 to the seeder shaft a ratchet wheel 33 is rigidly secured to said shaft, and a pawl 34 which is pivotally mounted on the plate 26$^b$ of carrier 26 is disposed so as to engage the notches 33$^a$ of the ratchet. These notches are rectangular and the pawl 34 is shaped to fit both the front and the rear sides of the notches. The front side of each notch is higher than the rear side, the periphery of the ratchet between the notches curving inward toward the axis of the ratchet. A spring 35 interposed between one end of the pawl and the carrier serves to normally press the pawl into engagement with the ratchet. The ratchet is formed with four notches, and it is clear that if the pawl is permitted to move freely under the action of the spring 35, that the full movement of the clutch carrier will be transmitted to the ratchet and to the shaft 14.

It is desirable, however, in some instances, to transmit to the seeder shaft only a part of the movement of the clutch carrier, for by so doing the number of seeds delivered at each dropping action may be varied. For example, if a seed plate is employed having sixteen single seed cells and the seeder shaft pinion has one-fourth as many teeth as the annular seed plate gear with which it engages, it is clear that a full rotation of the seeder shaft will cause four seeds or kernels to be delivered upon the dropping valve. Similarly, if only three-fourths of the intermittent movement of the clutch carrier were transmitted to the seeder shaft, it is clear that only three seeds would be delivered upon the dropping valve. Again, a half rotation of the seeder shaft will cause the delivery of two seeds.

To effect such variation in the rotation of the seeder shaft, I provide the following devices: 36 is a cross-tie casting rigidly secured to the frame bars 7 and 8 and having an upstanding part 36$^a$, upon which is pivotally mounted a cam lever 37. The forward part of said lever extends beneath and in front of the seeder shaft and carries at one side the cam proper 38. The lever 37 is formed with a socket 37$^a$ to receive the end of an arm 39, which carries at its end a foot rest 39$^a$. The rearward extending end of the lever 37 is formed with a tooth 37ᵇ adapted to engage a series of notches in a lug or post 36ᵇ on the casting 36. To permit the ready adjustment of the cam lever by the foot of the rider, a spring 40 is interposed between the lever and the head of the pin on which said lever is pivoted. This spring serves to hold the cam lever securely in adjusted position and at the same time will yield to the pressure of the driver's foot on the foot rest 39ª to permit the cam lever to move from one notch to another of the post 36ᵇ.

The pawl 34 carries a roller 41 in position to overlie the cam 38. Referring to Fig. 10, it is clear that when the cam lever is adjusted to the lower one of the three notches of the lug 36ᵇ, the roller 41 of pawl 34 will move outside of the cam 38, as the pawl carrier rotates, without engaging said cam. Therefore, with the cam in this position, the planter will drop four seeds or kernels at each intermittent movement of the seeder shaft, initiated by the check-row devices. When, however, the cam lever is disposed in the middle notch, it will be seen that the cam is moved outward far enough to be engaged by the roller 41 of the pawl, thus causing the latter to be withdrawn from engagement with the ratchet long enough for the pawl to pass over one of the notches of said ratchet. Thus, only three-fourths of the full rotation of the pawl carrier is transmitted to the seeder shaft, so that three instead of four seeds are delivered upon the dropping valve. If, finally, the cam lever be moved to the upper notch, as indicated in Fig. 12, the cam serves to hold the pawl out of engagement with the ratchet long enough for the pawl to pass over two of the ratchet notches, so that only one-half the rotation of the pawl carrier is transmitted to the seeder shaft and only two seeds will be delivered upon the dropping valve during said rotation. The cam is so arranged that, in whatever position it lies, the roller or pawl disengaging device always rotates in circles outside of the cam. The operative end of the pawl is therefore quickly drawn out from the notches. The contacting surfaces of the cam and roller are exposed so as to be readily cleansed if at any time it is found that foreign materials are adhering, and accuracy of movement of the parts can be preserved It is seen from the above description that the rider or operator can very easily vary the number of seeds delivered at each dropping operation by a simple movement of the foot lever, and it will be observed that the desired result is obtained by means of a mechanism having a minimum number of parts, which are simple both in construction and in operation. The mechanism has no frail or delicate parts liable to get out of order in use, and it is adapted, furthermore, to give to the seeder shaft a very accurate intermittent movement. This latter result is due, in large part, to the peculiar construction of the ratchet and pawl, which is such that the ratchet cannot move away from the pawl in either direction so long as the pawl engages one of the notches of the ratchet. Since the movement of the ratchet both begins and ends with the pawl in engagement, it is clear that the extent of movement of the ratchet, while not necessarily the same as that of the pawl, will be quite as accurately determined. The notches of the ratchet being widely spaced, there is little opportunity for the pawl to engage the wrong notch when it is released by the cam, and it is impossible for the pawl to slip over a notch because the front side of each notch is higher than the rear side.

It is to be understood, of course, that a planter embodying my improvements can be used for drilling, as well as for planting in hills. To do this it is only necessary to lock the check-fork in its rearmost position, thus holding the roller 31 out of the path of the clutch dog 27, and to adjust the cam lever 37 at the lower notch, that is, with the cam in inoperative position, so that the pawl 34 will remain in engagement with the ratchet 33 continuously.

What I claim is—

1. In a planter or the like, the combination with a seed counting or measuring mechanism, of a shaft for driving said mechanism, a ratchet wheel secured on said shaft having rectangular notches, a pawl adapted normally to engage said wheel, the pawl being shaped to fit the straight front and rear sides of the ratchet notches, a power driven carriage for the pawl mounted on the said shaft, and a cam device arranged to be engaged by the pawl and adjustable at will to cause the disengagement of the pawl during different angular movements of the pawl carrier, substantially as set forth.

2. In a planter or the like, the combination with a seed counting or measuring mechanism, of a shaft for driving said mechanism, a ratchet wheel secured on said shaft having rectangular notches, the front sides of said notches being higher than their rear sides, a pawl adapted normally to engage said wheel, the pawl being shaped to fit the straight front and rear sides of the ratchet notches, a power driven carrier for the pawl mounted on the said shaft, and a cam device arranged to be engaged by the pawl and adjustable at will to cause the disengagement of the pawl during different angular movements of the pawl carrier, substantially as set forth.

3. A clutch mechanism including, in combination, a rotatable shaft, a constantly rotatable clutch member journaled upon said shaft and having a rim portion provided with internal depressions, a sleeve journaled upon said shaft adjacent said clutch member, a pawl carried by said sleeve and adapted to engage with said depressions, a rocking clutch tripping member adapted to normally hold said pawl disengaged, a second clutch member secured to said shaft at the opposite end of said sleeve and provided with pawl engaging grooves upon its periphery, a second pawl carried by said sleeve and adapted to engage with said grooves, and a swinging cam adapted to engage with said second pawl and disengage it from said grooves at various degrees of the angular movement of said second clutch member.

4. A clutch mechanism including, in combination, a rotatable shaft, a constantly rotatable clutch member journaled upon said shaft and having a rim portion provided with internal depressions therein, a sleeve journaled upon said shaft adjacent said clutch member and provided with a pawl carrying arm having a semi-circular notch at its outer end, a rocking clutch tripping arm having a roller journaled thereon and adapted to engage with said notch, a spring-pressed pawl pivotally mounted upon said pawl carrying arm and adapted to engage with said internal depressions and with the roller upon said clutch tripping arm, a second clutch member secured to said shaft at the opposite end of said sleeve and provided with pawl engaging grooves upon its periphery, a second spring-pressed pawl carried by said sleeve and adapted to engage with said grooves, and a swinging cam adapted to contact with said second pawl in a manner to disengage it from said grooves at varying degrees of the angular movement of said second clutch member.

5. A clutch mechanism including, in combination, a rotatable shaft, a constantly rotatable clutch member journaled upon said shaft and having a rim portion provided with internal depressions therein, a sleeve journaled upon said shaft adjacent said clutch member and provided with a pawl carrying arm having a semi-circular notch at its outer end, a rocking clutch tripping arm having a roller journaled thereon and adapted to engage with said notch, a spring-pressed pawl pivotally mounted upon said pawl carrying arm and adapted to engage with said depressions and with the roller upon said clutch tripping arm, a second clutch member secured to said shaft at the opposite end of said sleeve and provided with pawl engaging grooves upon its periphery, a second spring-pressed pawl pivotally mounted upon said sleeve and having one end adapted to engage with said grooves, the cam adapted to swing to operative positions at radial distances from the axis greater than the distances at which the second pawl normally rotates, and adapted to contact with the operative end of said pawl, to disengage it from said grooves in varying degrees of angular movement of the said second clutch member.

6. In combination with a seed plate, a driving shaft therefor, a rotary driving member, and a connecting device between the driving member and shaft, said connecting device being rotatable independently of the shaft and comprising means for connection to and disconnection from the driving member, and additional means for positive connection with the shaft, whereby when the device is disconnected from the driving member it may retain positive connection with the shaft and hold the same against overthrow movement.

7. In combination with a seed plate, a driving shaft therefor, a rotary driving member, and a connecting device between the driving member and shaft, said connecting device being rotatable independently of the shaft and comprising means for connection to and disconnection from the driving member and additional means for positive connection with the shaft, whereby when the device is disconnected from the driving member it may retain positive connection with the shaft and hold the same against overthrow movement, and releasable means locking the connecting device in position when connected with the shaft and disconnected from the driving member.

8. In combination with a rotary seed plate, a driving shaft therefor, a constantly rotating member, a connecting device rotatable with reference to the shaft and normally positively locked thereto, means for connecting the connecting device with the rotating member, and means for unlocking the connecting device from the shaft during the rotation of the connecting device and permitting it to be again locked to the shaft during the continued rotation of the connecting device, whereby the shaft will be held against rotation when it comes to rest.

9. In combination with a rotary seed plate, a driving shaft therefor, a rotating driving member, a connecting device rotatable relative to the shaft and adapted to be connected with the rotating member, a catch carried by said connecting device and adapted to be positively interlocked with the shaft at different points therearound, and means acting upon the catch for controlling its point of interlocked connection with the shaft.

10. In combination with a rotary seed plate, a driving shaft therefor provided with notches, a rotary driving member, a connecting device rotatable relative to the shaft and adapted to be connected with the driving member, a catch device movable with the connecting device and formed to enter the notches to form a positive connection between the catch and driving shaft, and means for controlling the engagement of said catch device in the notches.

11. In combination with a seeding mechanism, a driving member therefor, a connecting device normally connecting positively to the seeding mechanism and disconnected from the driving member, means for connecting the said device periodically with the driving member and for periodically disconnecting it therefrom, and means for disconnecting said device from the seeding mechanism and permitting reconnection therewith before the said device is disconnected from the driving member.

12. In a corn planting machine, the combination of a driving element, a seed operating shaft, a connecting device between said parts adapted to connect with the driving element and adapted also to positively interlock with the shaft at any one of a plurality of predetermined points in its circumference, and means for disconnecting said device from the driving element without disengaging it from the shaft, whereby when the shaft comes to rest it will be held positively from rotation by the connecting device.

13. In combination with a rotary seed plate, a driving shaft therefor provided with a plurality of notches spaced therearound, a constantly operating driving disk, a connecting device between the shaft and disk, comprising an arm rotatable independently of the shaft and provided with a recess, a locking dog pivoted to the arm and adapted to extend across the recess and to engage the disk, and a catch pivoted to the arm and adapted to engage in the notches in the shaft, a check-row mechanism, a locking arm actuated thereby and normally engaging in the recess in the first mentioned arm to hold the same with the locking dog disengaged from the disk, said locking arm adapted to be operated by the check-row mechanism to release the first mentioned arm and permit the locking dog to make connection with the disk, and means for thereafter engaging the catch in one of the notches in the shaft.

In testimony whereof I affix my signature, in presence of two witnesses.

CHARLES E. WHITE.

Witnesses:
 FRED F. HATCHER,
 GEORGE E. LEACH.

Copies of this patent may be obtained for five cents each, by addressing the "Commissioner of Patents, Washington, D. C."

It is hereby certified that in Letters Patent No. 1,287,541, granted December 10, 1918, upon the application of Charles E. White, of Moline, Illinois, for an improvement in "Planters," an error appears in the printed specification requiring correction as follows: Page 3, line 104, claim 1, for the word "carriage" read *carrier;* and that the said Letters Patent should be read with this correction therein that the same may conform to the record of the case in the Patent Office.

Signed and sealed this 4th day of March, A. D., 1919.

[SEAL.]

R. F. WHITEHEAD,

*Acting Commissioner of Patents.*

Cl. 111—38.